March 6, 1956 P. W. THORNHILL 2,737,301
BUFFERS FOR RAILWAY, TRAMWAY AND LIKE VEHICLES
Filed Dec. 1, 1952 2 Sheets-Sheet 1

March 6, 1956 P. W. THORNHILL 2,737,301
BUFFERS FOR RAILWAY, TRAMWAY AND LIKE VEHICLES
Filed Dec. 1, 1952 2 Sheets-Sheet 2

United States Patent Office 2,737,301
Patented Mar. 6, 1956

2,737,301
BUFFERS FOR RAILWAY, TRAMWAY AND LIKE VEHICLES

Peter Warborn Thornhill, Harbury, England, assignor to Levitation Limited, Coventry, England, a British company Application December 1, 1952, Serial No. 323,356

7 Claims. (Cl. 213—43)

This invention relates to buffers for railway, tramway and like vehicles, and has for its object to provide a buffer having better shock-absorbing characteristics than the known spring buffers.

According to the present invention, a buffer comprises a piston-and-cylinder unit the piston of which is forced into the cylinder when a load is applied to the buffer, to displace liquid through a controlled orifice, the displaced liquid acting to compress air and thereby provide a restoring force to return the buffer to its extended position.

The invention is hereinafter described with reference to the accompanying drawings, in which.

Figure 1:
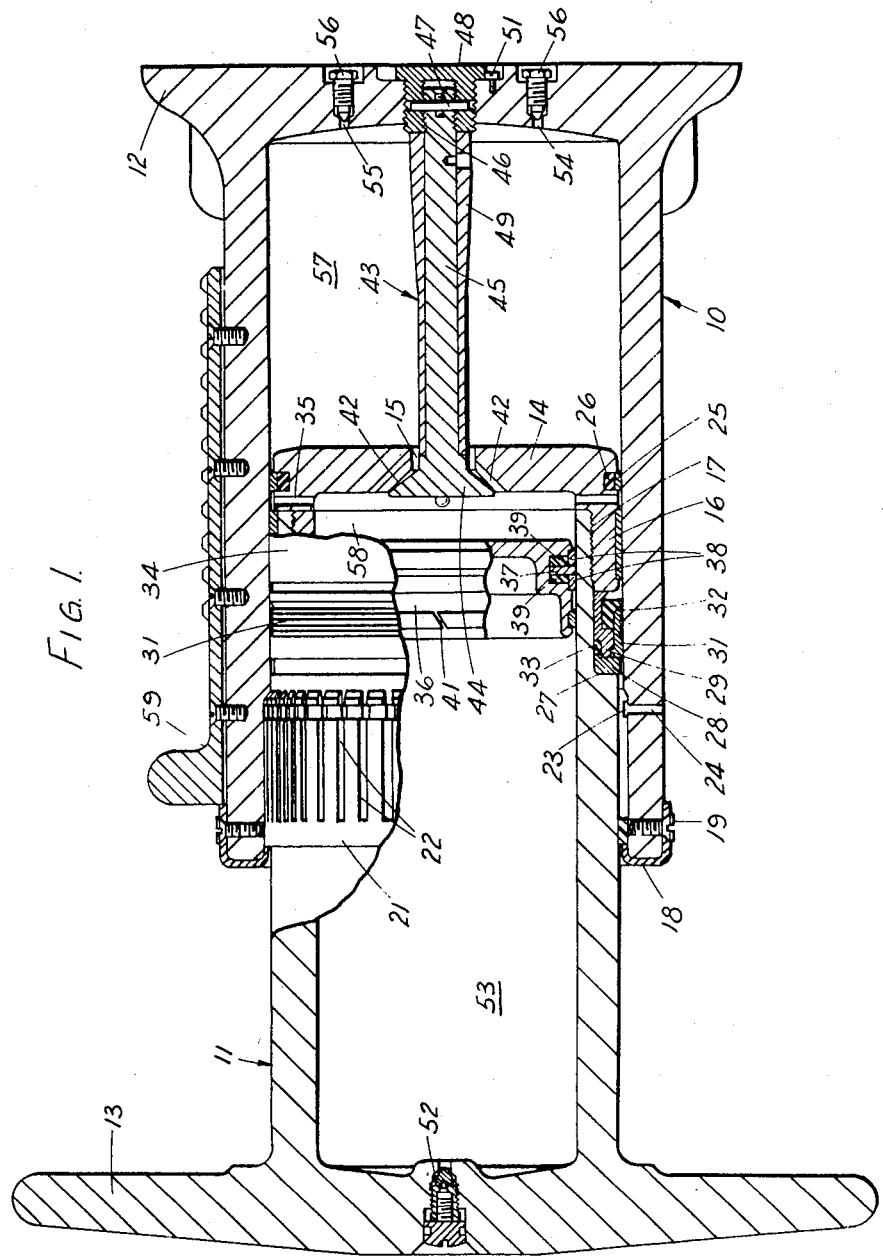
Figure 1 is a longitudinal vertical section of one form of buffer according to the invention.

Referring to Figure 1, the buffer comprises cylinder and piston members 10 and 11, the cylinder member 10 being closed at one end, as shown, and being provided at that end with a flange 12. Holes are provided in the flange to receive bolts by which the buffer is secured to the buffer beam of a vehicle. The piston member 11 has the usual buffer head 13 at its outer end and is hollow, being closed at its outer end by the head 13, and having at its inner end a cap 14 formed with a central orifice 15. The cap 14 has a skirt 16 internally screw threaded to screw on to the piston at 17. A stop ring 18, secured to the open end of the cylinder by set-screws 19, forms an abutment for a combined bearing and scraper ring 21, fitting in the cylinder, the ring 21 being a continuous ring of nylon or similar relatively hard flexible and resilient material, and being of such a diameter initially that it has to be stretched to fit over the piston member 11. The ring 21 is divided by saw cuts 22 extending from its inner end to within a short distance of its outer end, so that only a short length at its outer end grips tightly on the piston member, and a circumferential groove 23 is formed externally in it adjacent its inner end, the groove 23 registering with a port 24 in the cylinder wall.

Two packings are provided between the piston and cylinder members, the inner or primary packing, which is housed in a circumferential groove in the cap 14, comprising a continuous ring 25 of nylon or similar relatively hard flexible and resilient material bearing on the cylinder surface, and a backing ring 26 of softer material such as rubber. Between the end of the skirt 16 and a shoulder 27 on the piston is mounted the outer or secondary packing, which is of the kind described in British patent specification No. 664,710. This packing comprises a metal ring 28 resting against the shoulder 27, a stepped metal ring 29 clamped between the ring 28 and the skirt 16 of the cap 14, a sleeve 31 of nylon or similar relatively hard flexible and resilient material extending between the larger diameter portion of the ring 29 and the cylinder wall and projecting towards the inner end of the piston member, and a ring 32 of rubber compressed between the projecting portion of the sleeve 31 and the smaller-diameter portion of the ring 29 to urge that portion of the sleeve outwardly. The projecting portion of the sleeve 31 is grooved externally, the grooves being of triangular cross-section with their outer walls substantially perpendicular to the cylinder surface. A ring 33 of rubber is located between the rings 28 and 29 to prevent leakage between the said rings and the piston wall. A split ring 34 of nylon or similar material is located in a groove in the skirt 16 between the two packings, to provide an inner bearing for the piston, and passages 35 lead from the space between the said packings to the interior of the cylinder.

A floating piston 36 is slidably mounted in the interior of the piston member 11 and divides the interior thereof into first and second chambers 58 and 53 respectively, the floating piston being grooved to receive a packing comprising a continuous rubber ring 37 which bears on the wall of the piston member and is radially compressed on assembly, two continuous nylon rings 38 arranged one on each side of the rubber ring 37, and additional continuous rubber rings 39 which are compressed on assembly to urge the nylon rings against the wall of the piston member. The floating piston 36 also carries a split nylon bearing ring 41.

The orifice 15 in the cap 14 is countersunk at its end which opens into the interior of the piston member, the countersunk portion being formed with grooves 42. A metering pin 43 secured to the closed end of the cylinder member 10 projects through the orifice and has a head 44 which engages with the countersunk portion of the orifice 15 to limit outward movement of the piston member 11. The metering pin 43 comprises a stem 45 which carries the head 44 and is secured by co-operating screw threads at 46 and a cross-pin 47 to a hollow plug 48 screwed into the cylinder end; and a tapered sleeve 49 fitting on the pin. The plug 48 is locked in position by a set screw 51 engaging one of the faces of its hexagonal head. The damping characteristics of the buffer can be changed without complete dismantling by unscrewing the plug 48 from the cylinder, extracting the pin 47, removing the plug from the stem 45, and replacing the sleeve 49 by another of a different shape.

An inflating valve 52 is provided in the centre of the head 13 to permit air to be pumped into the second chamber 53 in the piston, and two openings 54 and 55 in the closed end of the cylinder 10, fitted with screw plugs 56 provide for the pumping of liquid into, and the simultaneous escape of air from, the first chamber 57 in the cylinder and the space 58 in the piston.

A step 59 is secured to the cylinder member 10 by means of set screws.

The buffer operates in the following manner. The compressed air in the second chamber 53 extends the buffer until the head 44 engages the cap 14. An impact on the buffer head forces the piston member 11 inwardly, causing liquid to flow through the orifice 15 from the first chamber 57 into the space 58, and thus further compressing the air in the second chamber 53. The metering pin 43, by restricting the orifice 15, controls the rate at which the piston moves, and the impact force is dissipated in forcing the liquid through the orifice, the rate of dissipation being increased towards the end of the stroke owing to the taper of the metering pin. The metering pin 43 thus constitutes piston-position responsive means controlling the effective area of the orifice 15. The recoil stroke is effected by the energy of the compressed air, and is damped by the restriction of the return flow of liquid through the orifice 15.

The head 44, during the compression stroke, deflects outwardly the liquid flowing through the orifice 15, thus preventing it from impinging directly on the floating piston 36. Thus the possibility of the piston 36 being forced back by the impact of the liquid thereon, with resulting cavitation in the first chamber 58, is avoided.

The groove 23 and port 24 provide a passage for the escape of liquid which may leak past both the packings between the cylinder and piston members, thus preventing such liquid from becoming trapped and preventing extension of the buffer.

Figure 2:
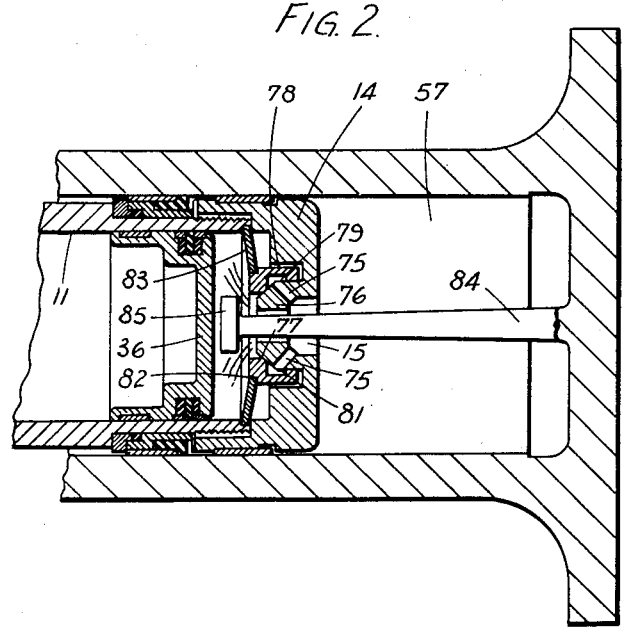
Figure 2 is a partial longitudinal section of a modified form of buffer.

The arrangement shown in Figure 2 of the drawings includes a relief valve controlling by-pass ports in parallel with the orifice 15, the relief valve being arranged to open when the pressure in the cylinder space 57 exceeds a predetermined limit. The by-pass ports 75 open into the interior of the piston through the circumferential wall of a boss 76 formed on the cap 14, the orifice 15 extending axially through the boss. The inner end of the boss is chamfered at 77, and a ring-shaped valve member 78 is slidably mounted on the boss, the valve member 78 having an internal circumferential groove 79, bounded at one side by a wall 81 having an internal diameter such that it fits closely on the cylindrical surface of the boss 76, and bounded on the other side by a wall 82 having a smaller internal diameter. The edge of the wall 82 seats on the chamfer 77, being urged thereagainst by a washer-like spring 83 taking its abutment on the end of the piston member 11. The ports 75 open into the groove 79, and it will be seen that the pressure in the cylinder space 57 thus acts on the unbalanced area of the wall 82 of the groove to displace the valve member and move the edge of the wall 82 away from the chamfer 77. The pressure at which the valve opens will depend on the relative internal diameters of the two ends of the valve member, and on the spring load, and, by making the difference between the two diameters small, a valve can be provided which will open only at a very high pressure, without calling for a spring of great strength.

In this arrangement, as in that shown in Figure 1, the metering pin, which is shown as a solid tapered pin 84, has a head 85 acting both as a deflector to ensure that the liquid passing through the orifice 15 does not impinge directly on the floating piston 36, and as a stop to limit the extension of the buffer.

I claim:

1. A railroad vehicle buffer comprising a cylinder element, a hollow piston element slidable in said cylinder element, a buffer head mounted on one of said elements, said other element being adapted for attachment to a railroad vehicle, a floating piston in said hollow piston element dividing the interior thereof into first and second chambers, means defining an orifice connecting said first chamber with the interior of the cylinder element, piston-position responsive means controlling the effective area of said orifice, primary packing means carried by the hollow piston element closely adjacent the inner end of said piston element and engaging the cylinder element, secondary packing means carried by said hollow piston element and spaced from said primary packing on the outer side thereof, orifice means connecting a space between said packings with said first chamber, and bearing means carried by said cylinder element and engaging said hollow piston element externally of said packing means, said cylinder element and said first chamber being filled with liquid and the said second chamber containing compressed air.

2. A railroad vehicle buffer comprising a cylinder element, a hollow piston element slidable in said cylinder element, a buffer head mounted on one of said elements, said other element being adapted for attachment to a railroad vehicle, a floating piston in said hollow piston element dividing the interior thereof into first and second chambers, means defining an orifice connecting said first chamber with the interior of the cylinder element, piston-position responsive means controlling the effective area of said orifice, primary packing means carried by the hollow piston element closely adjacent the inner end of said hollow piston element and engaging the cylinder element, secondary packing means carried by said hollow piston element and spaced from said primary packing on the outer side thereof, orifice means connecting a space between said packings with said first chamber, first bearing means carried by said cylinder element and engaging said hollow piston element externally of said secondary packing means, and second bearing means comprising a split ring of hard flexible and resilient material carried by said hollow piston element between the primary and secondary packing means and engaging the cylinder element, said cylinder element and said first chamber being filled with liquid and the said second chamber containing compressed air.

3. A railroad vehicle buffer according to claim 1, said bearing means comprising a continuous ring of hard flexible and resilient material formed with an internal diameter less than the external diameter of the hollow piston element and stretched by the insertion of the hollow piston element therein, and means locating said ring axially and radially in the cylinder element.

4. A railroad vehicle buffer as defined in claim 1, said bearing means comprising a ring of hard flexible and resilient material, a circumferentially continuous portion defining one end of said ring, and longitudinal fingers extending from said circumferentially continuous portion inwardly of said cylinder element, the circumferentially continuous portion of said ring having an internal diameter, less than the external diameter of the hollow piston element and stretched by the insertion of the hollow piston element therein, and means locating said ring axially and radially in the cylinder element.

5. A railroad vehicle buffer as defined in claim 1 and including additional orifice means connecting said cylinder element and said first chamber and relief valve means controlling said additional orifice means, said relief valve means being responsive to pressure in said cylinder element.

6. A railroad vehicle buffer as defined in claim 1, and including a cylindrical boss surrounding the orifice connecting the said first chamber with the interior of the cylinder element, said boss projecting into said first chamber, a ring surrounding said boss and formed with an internal circumferential groove, the ring having an internal diameter on one side of the groove which is smaller than its internal diameter at the other side of the groove, a chamfer on the boss, the edge of the smaller-diameter portion of the ring which defines one wall of the groove seating on said chamfer, passages through said boss opening into said groove, and spring means urging said ring to seat on said chamfer.

7. A railroad vehicle buffer comprising a cylinder element, a hollow piston element slidable in said cylinder element, a buffer head mounted on one of said elements, said other element being adapted for attachment to a railroad vehicle, a floating piston in said hollow piston element dividing the interior thereof into first and second chambers, means defining an orifice in said hollow piston element connecting said first chamber with the interior of the hollow piston element, a metering pin fixed to the cylinder element and extending into said orifice, a head on said metering pin in said first chamber, said head being of a diameter greater than that of the orifice whereby its deflects liquid passing through the orifice and prevents said liquid from impinging directly on the floating piston, packing means carried by the inner end of said hollow piston element and engaging the cylinder element, and bearing means carried by said cylinder element and engaging said hollow piston element externally of said packing means, said cylinder element and said first chamber being filled with liquid and the said second chamber containing compressed air.

References Cited in the file of this patent

UNITED STATES PATENTS

| | | |
|---|---|---|
| 1,470,153 | Dickerson | Oct. 9, 1923 |
| 1,772,387 | Dickerson | Aug. 5, 1930 |
| 2,243,782 | Thornhill | May 27, 1941 |
| 2,348,160 | Thornhill | May 2, 1944 |
| 2,370,942 | Dick | Mar. 6, 1945 |
| 2,564,790 | Orloff et al. | Aug. 21, 1951 |
| 2,614,833 | Laugaudin | Oct. 21, 1952 |
| 2,624,471 | Lunde | Jan. 6, 1953 |
| 2,679,827 | Perdue | June 1, 1954 |